US010598208B2

(12) United States Patent
Mai

(10) Patent No.: US 10,598,208 B2
(45) Date of Patent: Mar. 24, 2020

(54) HAMMER-OPERATED INDENTATION TOOL

(71) Applicant: Toyota Motor Engineering & Manufacturing North America, Inc., Erlanger, KY (US)

(72) Inventor: Lieu Xuan Mai, San Antonio, TX (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 161 days.

(21) Appl. No.: 15/595,139

(22) Filed: May 15, 2017

(65) Prior Publication Data

US 2018/0328398 A1  Nov. 15, 2018

(51) Int. Cl.
*F16B 39/02* (2006.01)
*B60B 27/00* (2006.01)
*B21D 17/02* (2006.01)

(52) U.S. Cl.
CPC ............ *F16B 39/025* (2013.01); *B21D 17/02* (2013.01); *B60B 27/00* (2013.01); *B60B 2310/314* (2013.01); *B60B 2900/113* (2013.01)

(58) Field of Classification Search
CPC .............. B21D 17/02; B21D 22/025; B60B 2310/314; B60B 27/00; B60B 2900/113; B25D 3/00; B25D 5/00; B25D 2250/295; B25D 1/16; B25B 2250/295; B25B 1/16; F16B 39/025
USPC ................ 29/235, 238, 257, 243.5
See application file for complete search history.

(56) References Cited

U.S. PATENT DOCUMENTS

| 865,063 A | * | 9/1907 | Sherwood | B25D 5/02 33/673 |
| 2,244,989 A | * | 6/1941 | Geddings | D01H 1/20 254/100 |
| 2,543,026 A | * | 2/1951 | Jennings | B25D 5/00 33/673 |
| 2,730,811 A | * | 1/1956 | Gouldsmith, Jr. | B25D 5/00 33/677 |
| 7,204,024 B2 | * | 4/2007 | Hubbs | B25D 5/02 30/358 |

(Continued)

FOREIGN PATENT DOCUMENTS

JP    5670063 B2    2/2015

*Primary Examiner* — Orlando E Aviles
*Assistant Examiner* — Robert F Neibaur
(74) *Attorney, Agent, or Firm* — Christopher G. Darrow; Darrow Mustafa PC

(57) ABSTRACT

An indentation tool includes an installation axis, a radially oriented indentation axis, and a defined reserved space for an indentation site of a cylindrically-shaped structure, as well as a base for installing onto the structure, and an elongate punch for indenting it at its indentation site. The reserved space is spaced apart from the installation axis, and has the indentation axis passing through it. The base extends along the installation axis, and is configured for coaxial installation onto the structure, whereby its indentation site occupies the reserved space. The punch is spaced apart from the installation axis, and is supported by the base for movement along the indentation axis between a home position, in which the punch vacates the reserved space, and an indentation position, in which the punch, leading with an indentation tip, reaches into the reserved space to indent the structure at its indentation site.

20 Claims, 5 Drawing Sheets

(56) References Cited

U.S. PATENT DOCUMENTS 7,653,975 B2 * 2/2010 Hu .......................... B66F 3/36
29/255
10,166,664 B2 * 1/2019 Sajdak ................. B25B 27/14

* cited by examiner

HAMMER-OPERATED INDENTATION TOOL

TECHNICAL FIELD

The embodiments disclosed herein relate to the assembly of component sets that include an internally threaded component threaded together with an externally threaded component.

BACKGROUND

Some component sets include an externally threaded component and a complementary internally threaded component. In the automotive field, for instance, some wheel bearing subassemblies include an externally threaded wheel hub and a complementary internally threaded lock nut. These component sets, with their internally threaded component threaded together with their externally threaded component in a partially-assembled state, sometimes require a further assembly step by which the internally threaded component is locked in a desired axial position on the externally threaded component. Vehicle manufactures, among others, may desire tools that facilitate a user's performance of this assembly step.

SUMMARY

Disclosed herein are embodiments of a hammer-operated indentation tool and assembly methods that involve its use. In order to lock an internally threaded component in a desired axial position on an externally threaded component that the internally threaded component is threaded together with, the indentation tool is configured to receive a hammer blow and, in response to the hammer blow, employ a punch to indent a neck of the internally threaded component into an external notch of the externally threaded component.

In one aspect, an indentation tool includes an installation axis, a radially oriented indentation axis, and a defined reserved space for an indentation site of a cylindrically-shaped structure. The indentation tool further includes a base for installing onto the cylindrically-shaped structure, and an elongate punch for indenting the cylindrically-shaped structure at the indentation site thereof. The reserved space is spaced apart from the installation axis, and has the indentation axis passing through it. The base extends along the installation axis, and is configured for coaxial installation onto the cylindrically-shaped structure, whereby the indentation site thereof occupies the reserved space. The punch is spaced apart from the installation axis and extends along the indentation axis. The punch has an indentation tip, and is supported by the base for reciprocating radial movement along the indentation axis between a radially outer home position and a radially inner indentation position. In the home position, the punch vacates the reserved space for occupation by the indentation site of the cylindrically-shaped structure. In the indentation position, the punch, leading with the indentation tip, reaches into the reserved space to indent the cylindrically-shaped structure at the indentation site thereof.

In another aspect, a method is drawn to progressing the assembly of a component set using an indentation tool having an installation axis and a radially oriented indentation axis. In the method, the component set, in a partially-assembled state, includes an internally threaded component threaded together with an externally threaded component. The internally threaded component has a neck, and the externally threaded component features an external notch. In the partially-assembled state, the neck of the internally threaded component has an indentation site at which the neck is subject to indentation into the external notch of the externally threaded component.

The method includes employing a base belonging to the indentation tool to coaxially install onto the component set, and employing an elongate punch belonging to the indentation tool to indent the neck of the internally threaded component, at the indentation site thereof, into the external notch of the externally threaded component. The base extends along the installation axis. When the base is employed to coaxially install onto the component set, the indentation site at the neck of the internally threaded component occupies a defined reserved space therefore spaced apart from the installation axis, and having the indentation axis passing through it. The punch is spaced apart from the installation axis and extends along the indentation axis. The punch has an indentation tip, and is supported by the base for reciprocating radial movement along the indentation axis between a radially outer home position and a radially inner indentation position. In the home position, the punch vacates the reserved space for occupation by the indentation site at the neck of the internally threaded component. In the indentation position, the punch, leading with the indentation tip, reaches into the reserved space. The employment of the punch includes imparting a hammer blow to the punch, and thereby inducing the punch to forcibly radially move along the indentation axis from the home position to the indentation position.

In yet another aspect, an indentation tool includes an installation axis and an indentation axis radially oriented, at an incline, in relation to the installation axis, as well as an annularly-shaped base and an elongate punch. The base extends along the installation axis, and has two opposed ends, a radially-facing internal wall between the opposed ends, and a punch housing. One of the two opposed ends is a leading end that terminates in an axially-facing lip, and the internal wall frames a receiving space opening from the leading end. The receiving space includes, as a sub-space, a defined reserved space at the internal wall, spaced apart from the installation axis. The receiving space has the indentation axis passing through it. The punch housing extends radially outward beyond the reserved space from the end opposite the leading end, and defines an open-ended internal channel extending along the indentation axis. The internal channel opens, at a radially inner end, to the internal wall in communication with the reserved space, and unobstructed at a radially outer end. In addition to defining the internal channel, the punch housing includes a spring mounted to the internal channel. The punch housing houses the punch. The punch has an indentation tip and a head opposite the indentation tip, and is coaxially received inside the internal channel for reciprocating inclined radial movement along the indentation axis between a radially outer home position and a radially inner indentation position. In the home position, the punch vacates the reserved space, and the head protrudes unobstructed from the radially outer end of the internal channel. In the indentation position, the punch, leading with the indentation tip, reaches into the reserved space. Under a hammer blow received at the head on behalf of the punch, the punch is induced to forcibly radially move along the indentation axis from the home position to the indentation position. Also, the spring is further mounted to the punch to thereafter automatically return the punch to along the indentation axis the home position.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

In the automotive field, some wheel bearing subassemblies include an externally threaded wheel hub and a complementary internally threaded lock nut. These and other component sets that include an internally threaded component and a complementary externally threaded component, with their internally threaded component threaded together with their externally threaded component in a partially-assembled state, sometimes require the further assembly step of indenting a neck of the internally threaded component into an external notch of the externally threaded component. This disclosure teaches a hammer-operated indentation tool that facilitates a user's performance of this indention assembly step by receiving a hammer blow and, in response to the hammer blow, employing a punch to indent the internally threaded component's neck into the externally threaded component's external notch.

Figure 1:
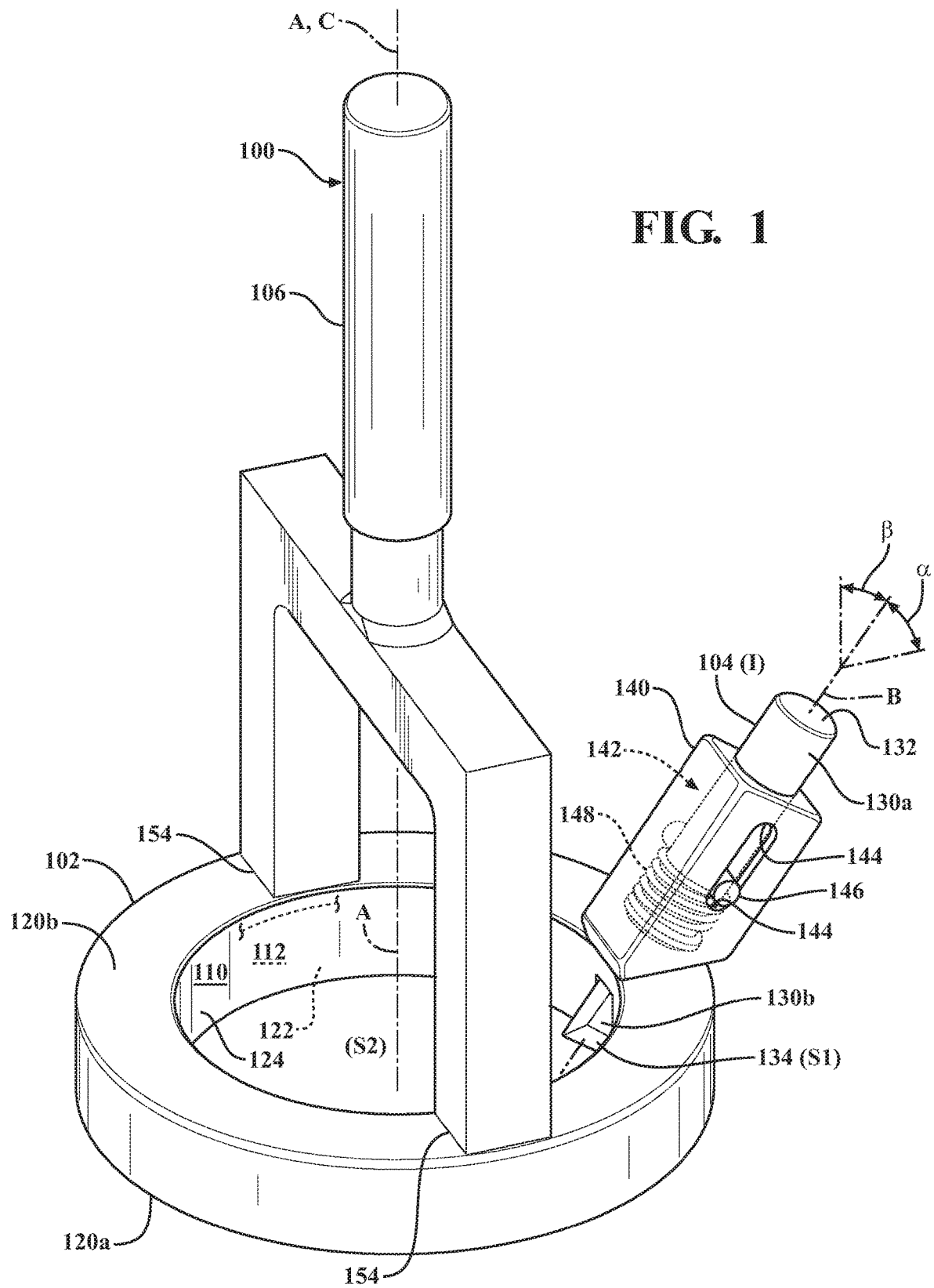
FIG. 1 is a perspective view of an indentation tool, showing a base employable to coaxially install onto a component set having an indentation site, a punch supported by the base, and employable to indent the component set at its indentation site, and a handle extending from the base employable to facilitate a user's handling of the indentation tool.

Indentation Tool. An indentation tool 100 is shown in FIG. 1. The indentation tool 100 has an installation axis A and a separate, intersecting, radially oriented indentation axis B. The indentation tool 100 includes a base 102 defining, and therefore extending along, the installation axis A, an elongate punch 104 supported by the base 102 for reciprocating radial movement along the indentation axis B, and an elongate handle 106 extending from the base 102.

Figure 2A:
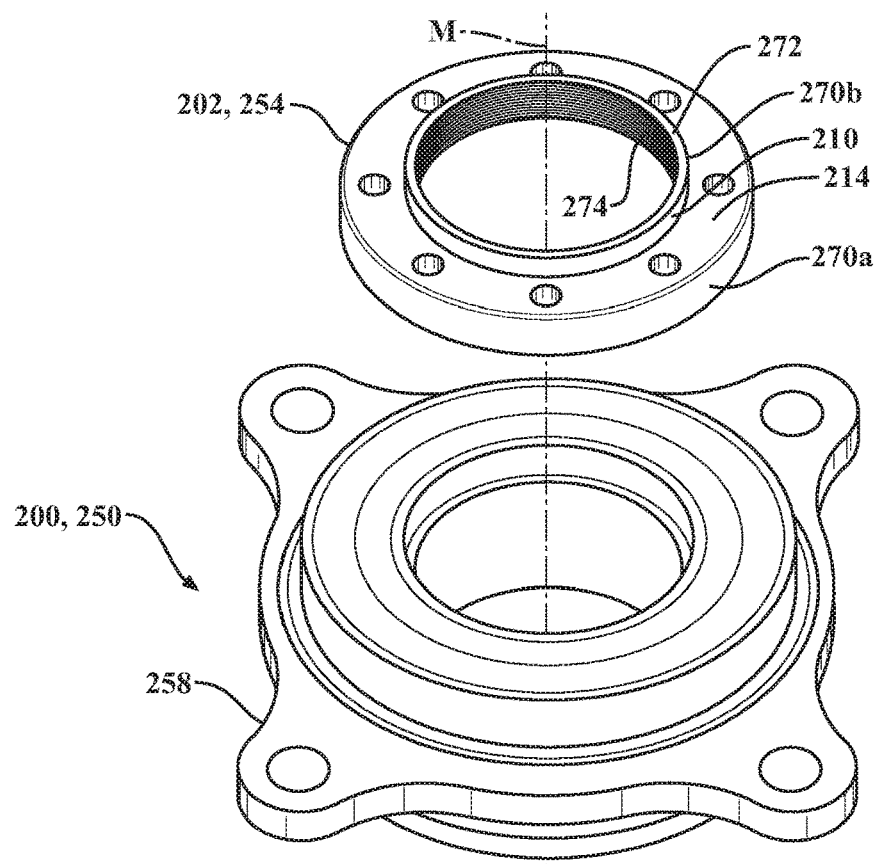
FIG. 2A is an exploded view of, as an example of a component set, a wheel bearing subassembly.
Figure 2A:
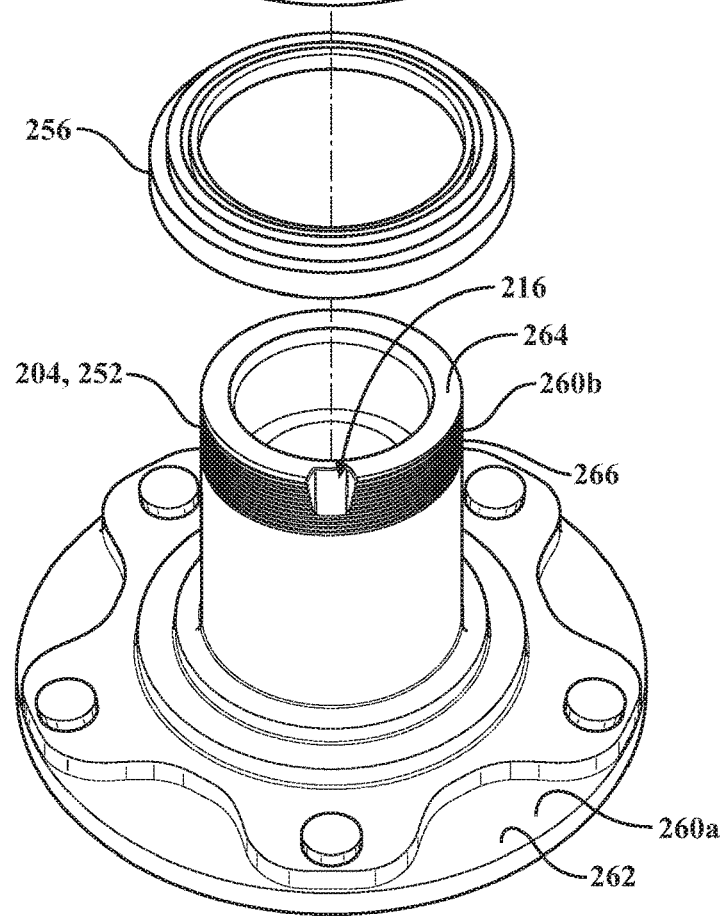
Figure 2B:
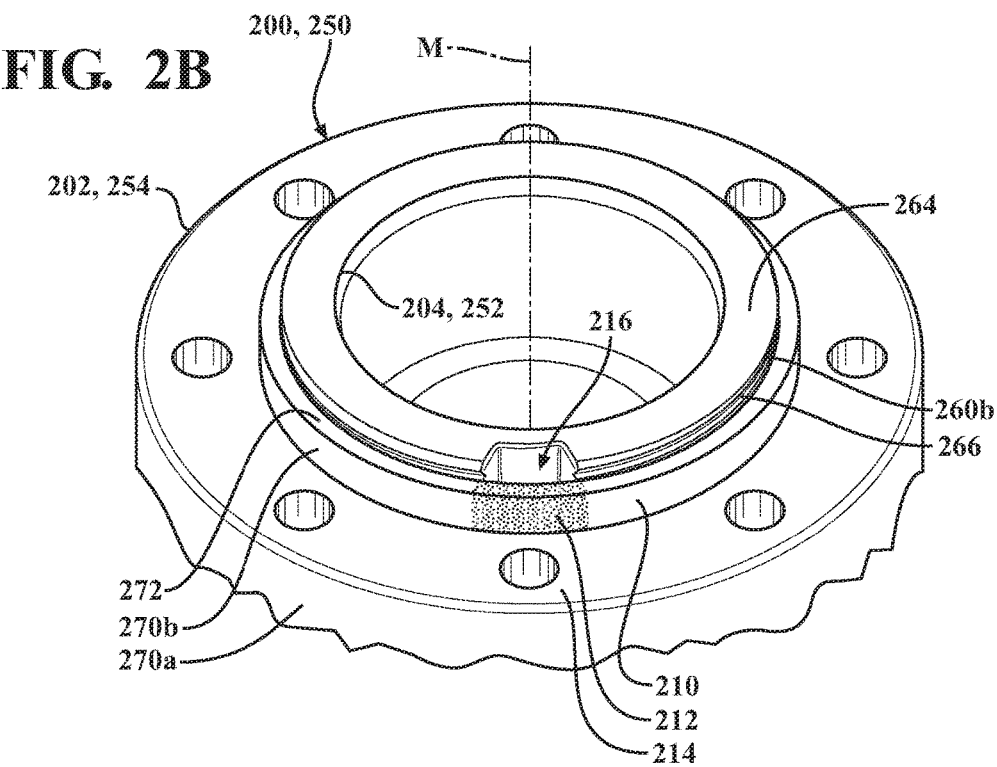
FIG. 2B is an enlarged perspective view of the wheel bearing subassembly which, in a partially-assembled state, requires indentation at its indentation site to progress its assembly.

The indentation tool 100 is operable to indent a component set 200, an example of which is represented in FIGS. 2A and 2B. As described in more detail below, the component set 200 has a primary axis M and, in a partially-assembled state, includes an internally threaded component 202 threaded together with an externally threaded component 204.

As a product of the combined structure of its components, the component set 200 has, in relevant part, a stepped annular or otherwise cylindrical shape along its primary axis M. The component set 200, via the internally threaded component 202, includes a neck 210, at which the component set 200 has an indentation site 212, and an external flange 214. The indentation site 212 radially opposes an angled external notch 216, which the component set 200 features via the externally threaded component 204. Accordingly, generally speaking, the component set 200 is subject to indentation at the indentation site 212. More specifically, the neck 210 of the internally threaded component 202 is subject to indentation, at the indentation site 212, into the external notch 216 of the externally threaded component 204.

In operation, the indentation tool 100 employs the base 102 to coaxially install onto the component set 200. With the base 102 coaxially installed onto the component set 200, the indentation tool 100 employs the punch 104 to indent the component set 200 at the indentation site 212 thereof. The handle 106 facilitates a user's handling of the indentation tool 100, including the user's coaxial installation of the indentation tool 100 onto the component set 200.

In an inline configuration, the installation axis A is common to a primary axis C of the larger indentation tool 100, and the handle 106, like the base 102, shares the primary axis C. With respect to the inline configuration, it will be understood that references in this description to the installation axis A refer, by extension, to the primary axis C, and vice versa.

The indentation axis B intersects the installation axis A. The indentation axis B, as a result, is radially oriented in relation to the installation axis A. The punch 104, as supported by the base 102, is spaced apart from the installation axis A, and extends along the indentation axis B. With additional reference to FIGS. 3A and 4A, the base 102 supports the punch 104 for forcible, axial-hammer-blow-induced radial movement along the indentation axis B, toward the installation axis A, from a radially outer home position (H) (shown in FIG. 3A) to a radially inner indentation position (I) (shown in FIGS. 1 and 4A). The base 102 additionally supports the punch 104 for automatic return movement along the indentation axis B, away from the installation axis A, to the home position (H).

The indentation tool 100 defines a reserved space (S1) for the indentation site 212 of the component set 200. The reserved space (S1) is spaced apart from the installation axis A, and has the indentation axis B passing through it. In the home position (H), the punch 104 vacates the reserved space (S1) for occupation by the indentation site 212 of the component set 200. When the punch 104 is in the home position (H), the reserved space (S1) lies between the installation axis A and the punch 104. From the home position (H) to the indentation position (I), on the other hand, the punch 104 reaches into the reserved space (S1).

Beyond defining the reserved space (S1), the indentation tool 100 features certain collaborative configurations between the base 102 and the punch 104 in relation to the component set 200. Most notably, with the punch 104 in the home position (H), and vacating the reserved space (S1), the base 102 is configured to coaxially install onto the component set 200 in a manner whereby the indentation site 212 thereof occupies the reserved space (S1).

With the indentation site 212 of the component set 200 occupying the reserved space (S1) as a product of this coaxial installation, the punch 104 is correlatively aligned with the indentation site 212 of the component set 200. Relatedly, with its ability to reach into the occupied reserved space (S1) under forcible radial movement from the home position (H) to the indentation position (I), the punch 104 is correlatively employable to indent the component set 200 at the indentation site 212. With the punch 104, thereafter, automatically returning to the home position (H), the base 102 is free for uninstallation from the indented component set 200, and coaxial reinstallation onto another, un-indented component set 200.

The indentation axis B intersects the installation axis A at an angle α with respect to normal. The punch 104 therefore indents the component set 200 on which the base 102 is coaxially installed, at the indentation site 212 thereof, at a complementary incidence angle β with respect to the primary axis M of the component set 200. Generally speaking, the angle α at which the indentation axis B intersects the installation axis A with respect to normal may depend on the specific indentation needs of the component set 200.

In an inclined configuration of the indentation tool 100, the indentation axis B intersects the installation axis A at an incline angle α away from normal or, in other words, at an incline. The punch 104 therefore indents the component set 200 on which the base 102 is coaxially installed, at the indentation site 212 thereof, at an incline, at a complementary inclined incidence angle β. Since, in the inclined configuration, the indentation axis B is radially oriented, at an incline, in relation to the installation axis A, the movement of the punch 104 may be referred to as reciprocating inclined radial movement along the indentation axis B between the home position (H) and the indentation position (I).

In one implementation of the inclined configuration, the incline angle α is approximately 54 degrees away from normal, and the complementary inclined incidence angle β is approximately 36 degrees. In another implementation, the incline angle α is approximately 45 degrees away from normal, and the complementary inclined incidence angle β is approximately 45 degrees. In another implementation, the incline angle α is approximately 30-60 degrees away from normal, and the complementary inclined incidence angle β is approximately 60-30 degrees. In a non-inclined configuration, the indentation axis B could intersect the installation axis A at an approximately 0 degree angle α with respect to normal, and the punch 104 could therefore indent the indentation site 212 of the component set 200 on which the base 102 is coaxially installed at a complementary approximately normal incidence angle β.

As noted above, the base 102 is configured to coaxially install onto the component set 200. Generally speaking, the base 102 is sized, shaped and otherwise configured for locating engagement with the component set 200 as part of this coaxial installation. More specifically, the base 102 is configured to assume axial alignment with the component set 200 by radially engaging it. Additionally, the base 102 is configured to assume a given axial position on the axially-aligned component set 200 by axially engaging it. The collaborative configurations between the base 102 and the punch 104 in relation to the component set 200 help assure that the indentation site 212 of the component set 200 occupies the reserved space (S1) as the combined product of the base 102 assuming axial alignment with the component set 200, and assuming its given axial position on the axially-aligned component set 200.

For purposes of radially engaging the component set 200 to assume axial alignment therewith, the base 102 features a radially-facing radial engagement face 110. The radial engagement face 110 is complementary to one or more radially-facing parts of the component set 200. With this radially-facing complementation, the radial engagement face 110 and, by extension, the base 102 to which it belongs, define the installation axis A on behalf of the indentation tool 100. Moreover, the radial engagement face 110 is configured to radially engage the complementary one or more radially-facing parts of the component set 200. Additionally, with this radial engagement, the base 102 necessarily assumes axial alignment with the component set 200.

The one or more radially-facing parts of the component set 200 to which the radial engagement face 110 is complementary exhibit mutual radial opposition. The radial engagement face 110 is configured to radially engage these complementary parts of the component set 200 to not only assume axial alignment with the component set 200, but also brace the axially-aligned component set 200 against radial loading. In operation of the indentation tool 100, this radial loading includes, most notably, that of the punch 104 as it indents the component set 200 at the indentation site 212 by reaching into the reserved space (S1) occupied thereby under forcible radial movement from the home position (H) to the indentation position (I).

The radial engagement face 110 may, as shown, be configured to continuously radially engage the complementary one or more radially-facing parts of the component set 200 with a closed-ended or otherwise contiguous radially-facing surface. Alternatively, the radial engagement face 110 could be configured to discontinuously radially engage the complementary one or more radially-facing parts of the component set 200 with multiple discrete radially-facing surfaces.

For purposes of axially engaging the axially-aligned component set 200 to assume its given axial position thereon, the base 102 features an axially-facing axial engagement face 112. The axial engagement face 112 is complementary to one or more axially-facing parts of the component set 200. With this axially-facing complementation, the axial engagement face 112 is configured to axially engage the complementary one or more axially-facing parts of the component set 200. Additionally, with this axial engagement, the base 102 necessarily assumes its given axial position on the axially-aligned component set 200.

The axial engagement face 112 may, as shown, be configured to continuously axially engage the complementary one or more axially-facing parts of the component set 200 with a closed-ended or otherwise contiguous axially-facing surface. Alternatively, the axial engagement face 112 could be configured to discontinuously axially engage the complementary one or more axially-facing parts of the component set 200 with multiple discrete axially-facing surfaces.

In relation to the component set 200, the radial engagement face 110 is configured to radially engage the complementary neck 210 of the internally threaded component 202, which is, by definition, radially-facing. Alternatively, or additionally, the radial engagement face 110 could be configured to radially engage, via being complementary to, one or more radially-facing parts of the externally threaded component 204 backing the neck 210. It will be understood that the radial engagement face 110 is, more generally, configured to engage, via being complementary to, one or more radially-facing parts of an annularly or otherwise cylindrically-shaped sub-structure of a stepped annularly or otherwise cylindrically-shaped structure.

The axial engagement face 112, on the other hand, is configured to axially engage the complementary external flange 214 of the internally threaded component 202, which is, by definition, axially-facing. It will be understood that the axial engagement face 112 is, more generally, configured to axially engage, via being complementary to, one or more axially-facing parts of a stepped sub-structure of an axially-aligned stepped annularly or otherwise cylindrically-shaped structure.

The base 102, in a circumscribing coaxial installation configuration, features both the radial engagement face 110 and the axial engagement face 112 as part of an annular shape. As a product of its annular shape, the base 102 has two opposed ends 120a, b, a leading end 120a of which terminates in a lip 122, and features an internal wall 124 between its two opposed ends 120a, b.

The internal wall 124 of the base 102 is, by definition, radially-facing, and serves, in the annularly-shaped base 102, as the radial engagement face 110. In relation to the component set 200, the radial engagement face 110, in identity with the internal wall 124, is complementary to the neck 210 of the internally threaded component 202, and is configured, in a circumscribing manner, to continuously radially engage the complementary neck 210 with the closed-ended or otherwise contiguous radially-facing surface forming the internal wall 124.

The radial engagement face 110 is also arranged around or, in other words, frames, a receiving space (S2) for the component set 200. The receiving space (S2) extends along the installation axis A, and is open-ended at the leading end 120a of the base 102. With its open-ended configuration, the receiving space (S2) is configured to coaxially receive the complementary neck 210 of the internally threaded component 202 and, by extension, the component set 200 to which it belongs, through the leading end 120a. With the component set 200 having the indentation site 212 at the neck 210, the receiving space (S2) includes, as a sub-space, the reserved space (S1) at the radial engagement face 110.

The lip 122 flanks the internal wall 124 at the leading end 120a of the base 102. The lip 122 is, by definition, axially-facing, and serves, in the annularly-shaped base 102, as the axial engagement face 112. In relation to the component set 200, the axial engagement face 112, in identity with the lip 122, is complementary to the external flange 214 of the internally threaded component 202, and is configured to continuously axially engage the complementary external flange 214 with the closed-ended or otherwise contiguous axially-facing surface forming the lip 122.

The punch 104 has a blow-receiving end 130a, at which the punch 104 includes a head 132. Opposite its blow-receiving end 130a, the punch 104 has an indentation-imparting end 130b that terminates in an indentation tip 134.

The head 132 is configured for receiving an axial hammer blow on behalf of the punch 104, under which the punch 104 is induced to forcibly radially move along the indentation axis B from the home position (H) to the indentation position (I). Although described with reference to an axial hammer blow, it will be understood that the configuration of the head 132 is not exclusive to its ability to receive axial blows from other implements. The indentation tip 134, on the other hand, is configured to indent or, in other words, impart, under plastic deformation, an indentation into, steel or other metals when forcibly driven into them. Although described with reference to metals, it will be understood that the configuration of the indentation tip 134 is not exclusive to its ability to indent other plastically deformable materials when forcibly driven into them.

For purposes of receiving an axial hammer blow, the head 132 extends normal to the indentation axis B along which the punch 104 extends. The head 132 may, for instance, have a rounded-over but otherwise generally flat circular shape. For purposes of indenting metals, the indentation tip 134 is configured as a wedge whose edge may, for instance, extend normally to the indentation axis B along which the punch 104 extends, along an imaginary line intersecting the installation axis A. This edge may be rounded-over to promote indentation as opposed, for instance, to piercing or cracking.

In the home position (H), the indentation tip 134, facing toward the installation axis A, vacates, but verges on, the reserved space (S1). The head 132, on the other hand, facing away from the installation axis A, protrudes unobstructed from the remainder of the indentation tool 100, including the base 102. This opens the head 132 for receiving an axial hammer blow. When the head 132 receives an axial hammer blow, the punch 104, leading with the indentation tip 134, reaches into the reserved space (S1) under the resulting forcible, axial-hammer-blow-induced radial movement from the home position (H) to the indentation position (I).

As noted above, the base 102 supports the punch 104 for reciprocating radial movement along the indentation axis B between the home position (H) and the indentation position (I). For purposes of supporting the punch 104, the base 102 includes a punch housing 140 for the punch 104.

The punch housing 140 extends radially outward beyond the reserved space (S1). In relation to the remainder of the annularly-shaped base 102, the punch housing 140 protrudes radially outward from the end 120b opposite the leading end 120a. The punch housing 140 features an elongate, open-ended internal channel 142. The internal channel 142 extends along the indentation axis B, and is complementary to the punch 104. At one, radially inner end, the internal channel 142 opens to the internal wall 124 serving as the radial engagement face 110, or otherwise from the punch housing 140, in communication with the reserved space (S1). At the other, radially outer end, the internal channel 142 opens from the punch housing 140 unobstructed from the remainder of the indentation tool 100.

As housed by the punch housing 140, the punch 104 is coaxially received inside the internal channel 142 along the indentation axis B. Generally speaking, the internal channel 142 guides the punch 104 for reciprocating radial movement along the indentation axis B. The punch housing 140, along the internal channel 142, features two shoulder faces 144 that each correspond to a stop face 146 featured by the punch 104. The shoulder faces 144 are spaced apart along the indentation axis B, and each interfere with the stop face 146 as the punch 104 reciprocatively radially moves along the indentation axis B. The shoulder faces 144, as a result, respectively limit this movement to being between the home position (H) and the indentation position (I).

For purposes of supporting the punch 104 for automatic return movement along the indentation axis B to the home position (H), the punch housing 140 also includes a spring 148 mounted between itself and the punch 104 to bias the punch 104, along the indentation axis B, toward the home position (H). The spring 148, in a helical spring configuration, is housed around the punch 104 in an expanded section 150 of the internal channel 142. The spring 148, at one end, is mounted to a narrowing junction 152 that terminates the expanded section 150 of the internal channel 142, or otherwise to the internal channel 142. At the other end, the spring 148 is mounted to the stop face 146, or otherwise to the punch 104.

As noted above, the handle 106 extends from the base 102. In the inline configuration, the handle 106 extends along the primary axis C. With the handle 106 sharing the primary axis C and, by extension, the installation axis A, the handle 106 has a bifurcated junction 154 with the annularly-shaped base 102 at the end 120*b* opposite the leading end 120*a*. The bifurcated junction 154 both assures the requisite clearance for the receiving space (S2) to coaxially receive the neck 210 of the internally threaded component 202 and, by extension, the component set 200 to which it belongs, through the leading end 120*a*, and provides visual access for a user to confirm their coaxial installation of the indentation tool 100 onto the component set 200.

The individual components of the indentation tool 100 may be made from metal or any other suitable material, either alone or in combination with other materials. The base 102 and the punch 104 may, for instance, be made from steel or other suitable metals. The handle 106 may, for instance, be made from steel or other suitable metals, in combination with an overlying polymeric material that serves as an external grip.

The base 102 and the handle 106 may be made as a unitary whole, or may be constructed from separately made components. If the base 102 and the handle 106 are constructed from separately made components, they respectively may be made as unitary wholes, or may be constructed from separately made sub-components. The punch 104, likewise, may be made as a unitary whole, or may be constructed from separately made sub-components. Any separately made components or sub-components, as the case may be, may be interconnected with fasteners, welds, adhesives or any combination of these.

Example Component Set. As shown with reference to FIG. 2A, the example component set 200 is a wheel bearing subassembly 250. The wheel bearing subassembly 250 is recognizable in the automotive field as part of the wheel hub assembly of an assembled vehicle. The wheel bearing subassembly 250 could be acquired as part of the wheel hub assembly to which it belongs, as a standalone assembly or in separate components.

The wheel bearing subassembly 250 includes an externally threaded wheel hub 252, as the externally threaded component 204, and a complementary internally threaded lock nut 254, as the internally threaded component 202. The wheel hub 252 serially externally supports the lock nut 254 and other components of the wheel bearing subassembly 250, such as a seal 256 and a wheel bearing 258, in mutual axial alignment along the primary axis M of the wheel bearing subassembly 250 to which they belong. Although it may include fewer, additional and/or alternative components than the seal 256 and the wheel bearing 258, the series of externally supported components in any event includes, and culminates in, the lock nut 254. In the wheel bearing subassembly 250, the lock nut 254 is threaded together with the wheel hub 252, and serves to keep the other externally supported components, such as the seal 256 and the wheel bearing 258, in position on it.

The wheel hub 252 has a stepped cylindrical shape. The wheel hub 252, more specifically, has a stepped annular shape. As a product of its stepped shape, the wheel hub 252 has a flanged end 260*a*, at which the wheel hub 252 includes an external flange 262. Opposite its flanged end 260*a*, the wheel hub 252 has a threaded end 260*b* that terminates in a lip 264.

In an assembled vehicle, the wheel hub 252 receives an externally splined end of an axle shaft. The wheel hub 252 may, accordingly, feature complementary internal splines, at its flanged end 260*a*, for instance. Between its flanged end 260*a* and its threaded end 260*b*, the wheel hub 252 features an external wall segment reserved for any externally supported components besides the lock nut 254, such as the seal 256 and the wheel bearing 258. At its threaded end 260*b*, the wheel hub 252 features external threads 266 and the external notch 216. It will be understood that the external threads 266 characterize the wheel hub 252 as externally threaded. In its location at the threaded end 260*b*, the external notch 216 opens from the lip 264, between it and the outside of the wheel hub 252, and axially extends across the external threads 266. In an angled configuration, the external notch 216 is radially outwardly angled from the point it opens from the lip 264 to the point it opens from the outside of the wheel hub 252.

The lock nut 254, similarly to the wheel hub 252, has a stepped annular shape. As a product of its stepped shape, the lock nut 254 has a flanged end 270*a*, at which the lock nut 254 includes the external flange 214. Opposite its flanged end 270*a*, the lock nut 254 has a necked end 270*b* that terminates in a lip 272.

In addition to the external flange 214 at its flanged end 270*a*, the lock nut 254 has the neck 210 at its necked end 270*b*. The neck 210, beyond its location at the necked end 270*b* of the lock nut 254, axially extends to the necked end 270*b* from the flanged end 270*a* of the lock nut 254. The lock nut 254, in other words, includes the external flange 214 at its flanged end 270*a*, and the neck 210 as its remainder. With the neck 210 located at its necked end 270*b*, lock nut 254 includes the lip 272 as part of its neck 210. As a product of various characteristics, such as its material and its sizing, the neck 210 is plastically deformable. Between its flanged end 270*a* and its necked end 270*b*, the lock nut 254 features internal threads 274. It will be understood that the internal threads 274 are complementary to the external threads 266 featured at the threaded end 260*b* of the wheel hub 252, and characterize the lock nut 254 as internally threaded.

The wheel hub 252 and the lock nut 254, as well as the externally supported components besides the lock nut 254, such as the seal 256 and the wheel bearing 258, are collaboratively configured to have certain functional relationships that support the assembly of the wheel bearing subassembly 250 to which they belong. Some of these functional relationships are the product of the lock nut 254, when being threaded together with wheel hub 252, having reached a given axial position on the wheel hub 252. In its given axial position on the wheel hub 252, the lock nut 254, for instance, keeps the other externally supported components in position on the wheel hub 252. Moreover, the lock nut 254 has, at its neck 210, the indentation site 212 at which the neck 210 is subject to indentation into the external notch 216 at the threaded end 260*b* of the wheel hub 252 in order to lock the lock nut 254 in its given axial position on the wheel hub 252.

As part of the assembly of the wheel bearing subassembly 250, with the externally supported components of the wheel bearing subassembly 250 besides the lock nut 254 positioned on the wheel hub 252, the lock nut 254 is threaded together with the wheel hub 252. More specifically, the lock nut 254, leading with its flanged end 270*a*, is threaded onto the threaded end 260*b* of the wheel hub 252. The lock nut 254, when it reaches a given axial position on the wheel hub 252, engages the other externally supported components with its external flange 214. Accordingly, in its given axial position on the wheel hub 252, the lock nut 254 keeps the other externally supported components in position on the wheel hub 252.

As shown with reference to FIG. 2B, with the lock nut 254 having reached its given axial position on the wheel hub 252, the lip 272 of its neck 210 is open to the external notch 216 at the threaded end 260b of the wheel hub 252. In its open relationship with the external notch 216, the lip 272 of the neck 210 may, for instance, generally circumferentially coincide with the lip 264 of the threaded end 260b of the wheel hub 252 from which the external notch 216 opens. As a result, although the neck 210 is largely in threaded engagement with, or otherwise backed by, the threaded end 260b of the wheel hub 252, it has a generally freestanding portion that radially opposes the external notch 216. This generally freestanding portion defines the indentation site 212. The indentation site 212 includes the portion of the lip 272 of the neck 210 that radially opposes the external notch 216, as well as a radially opposing surrounding portion of the neck 210 in the radial footprint of the external notch 216.

The individual components of the wheel bearing subassembly 250 may be made from metal or any other suitable material, either alone or in combination with other materials. The wheel hub 252 and the lock nut 254 may, for instance, be made from steel or other suitable metals.

Operation of the Indentation Tool. To complete or otherwise progress the assembly of the wheel bearing subassembly 250 beyond its depicted partially-assembled state, the lock nut 254 is locked in its given axial position on the wheel hub 252. To do this, the neck 210 of the lock nut 254 is indented, at its indentation site 212, into the external notch 216 at the threaded end 260b of the wheel hub 252. This act of indentation is done, more specifically, by employing the base 102 of the indentation tool 100 to coaxially install onto the un-indented wheel bearing subassembly 250, as shown in FIGS. 3A and 3B, and by employing the punch 104 of the indentation tool 100 to indent the neck 210 of the lock nut 254, at its indentation site 212, into the external notch 216 at the threaded end 260b of the wheel hub 252, as shown in FIGS. 4A and 4B.

Figure 3A:
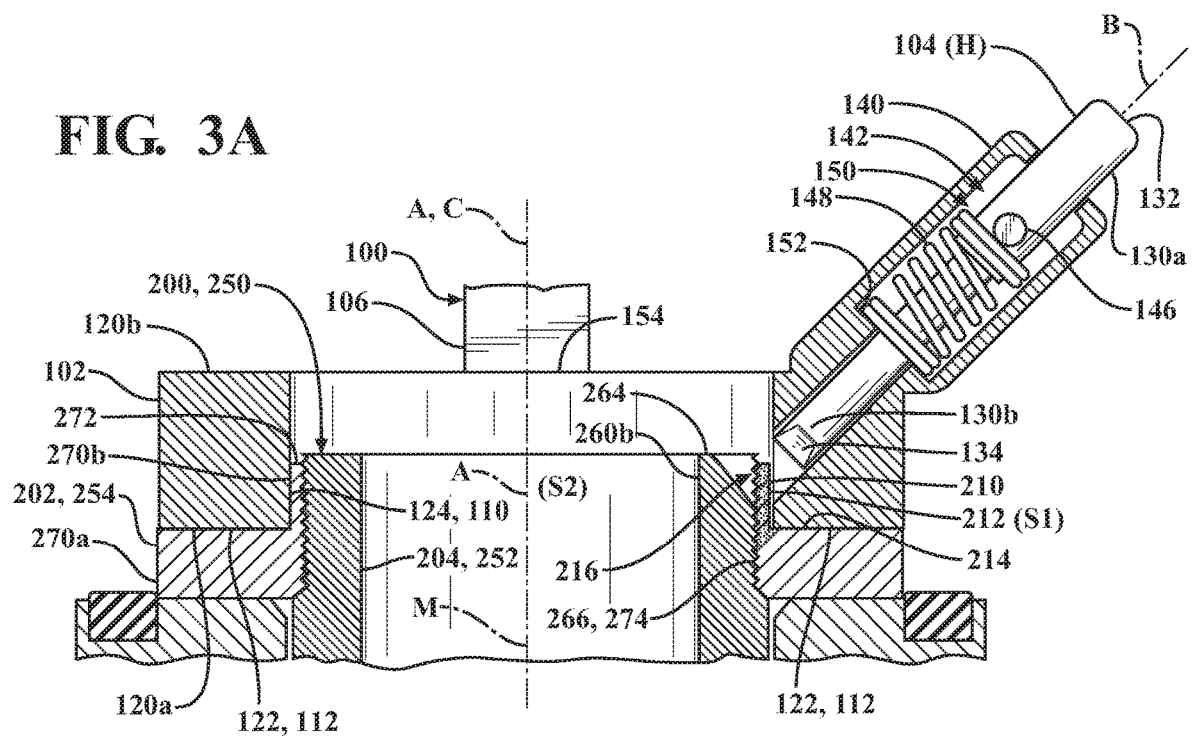
FIG. 3A is a cross sectional view of the indentation tool and the un-indented wheel bearing subassembly, showing the base of the indentation tool coaxially installed onto the un-indented wheel bearing subassembly, and the punch being employable to indent the un-indented wheel bearing subassembly at its indentation site.
Figure 3B:
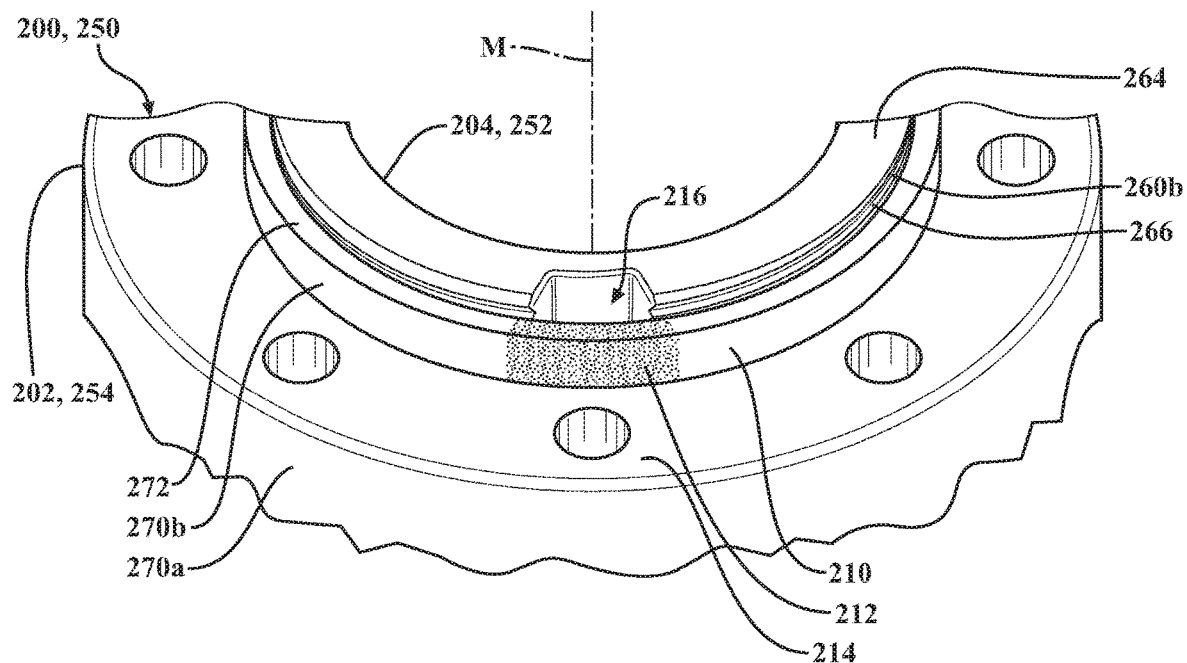
FIG. 3B is an enlarged perspective view of the un-indented wheel bearing subassembly, showing its indentation site before indention.

As shown in FIG. 3A, with the punch 104 in the home position (H), and vacating the reserved space (S1), a user employs the handle 106 to coaxially install the base 102 onto the wheel bearing subassembly 250 which initially, as shown in FIG. 3B, is un-indented. The radial engagement face 110 radially engages the complementary neck 210 of the lock nut 254 to assume, on behalf of the base 102, axial alignment with the wheel bearing subassembly 250. The axial engagement face 112, on the other hand, axially engages the complementary external flange 214 of the lock nut 254 to assume, on behalf of the base 102, its given axial position on the axially-aligned wheel bearing subassembly 250. As an additional part of the coaxial installation, the user circumferentially arranges the base 102 on the axially-aligned wheel bearing subassembly 250 to occupy the reserved space (S1) with the indentation site 212 at the neck 210 of the lock nut 254.

As a product of the coaxial installation of the base 102 onto the wheel bearing subassembly 250, the indentation site 212 at the neck 210 of the lock nut 254 occupies the reserved space (S1), and the punch 104 is correlatively aligned with the indentation site 212 at the neck 210 of the lock nut 254. A user, with one hand, employs the handle 106 to hold the indentation tool 100. With their other hand, the user wields a hammer to impart an axial hammer blow to the head 132 of the punch 104.

Figure 4A:
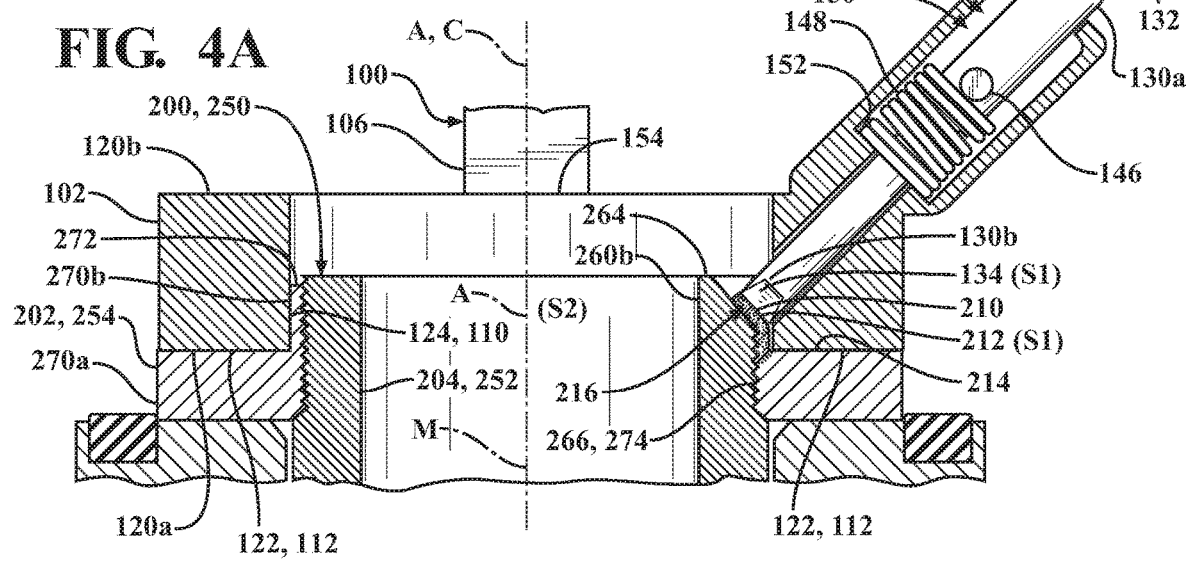
FIG. 4A is a cross sectional view of the indentation tool and the wheel bearing subassembly, showing the punch being employed to indent the wheel bearing subassembly at its indentation site.
Figure 4B:
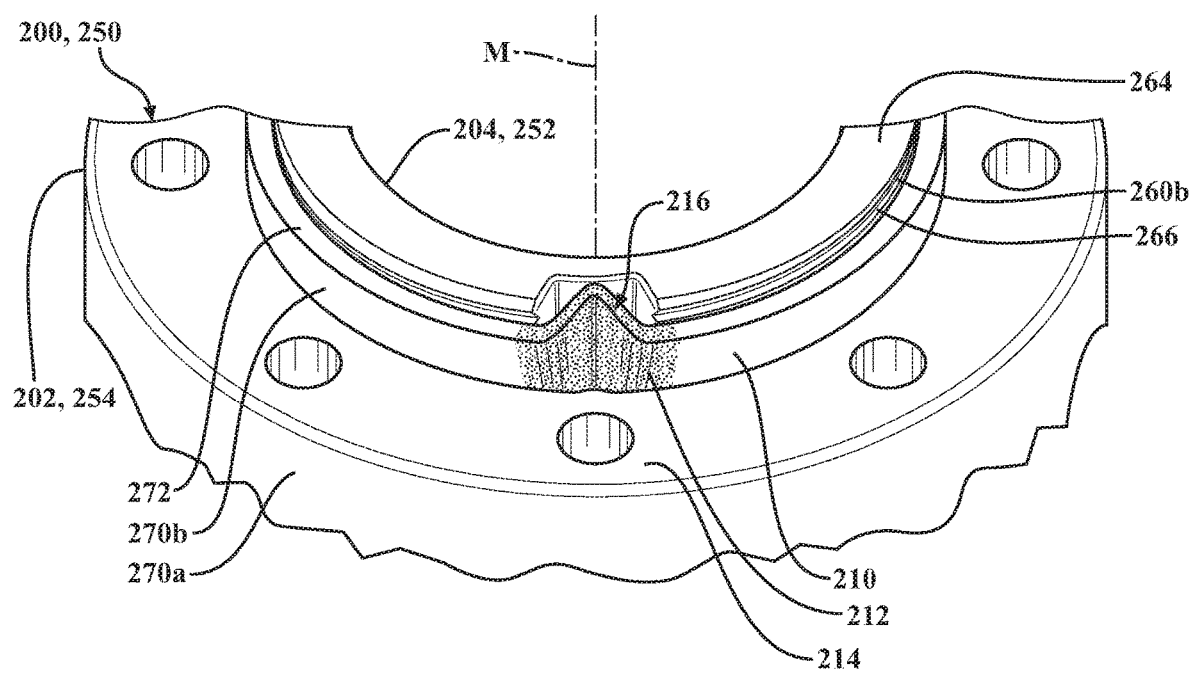
FIG. 4B is an enlarged perspective view of the indented wheel bearing subassembly, showing its indentation site after indention.

As shown in FIG. 4A, when the head 132 receives the axial hammer blow on behalf of the punch 104, the punch 104 is induced to forcibly radially move along the indentation axis B from the home position (H) to the indentation position (I). The punch 104, leading with the indentation tip 134, reaches into the reserved space (S1) under the resulting forcible, axial-hammer-blow-induced radial movement from the home position (H) to the indentation position (I). The indentation tip 134, as it reaches into the reserved space (S1) under this forcible radial movement, starting with the portion of the lip 272 of the neck 210 that radially opposes the external notch 216, is forcibly driven into the neck 210 of the lock nut 254 at its indentation site 212.

The indentation tip 134, as a result, imparts, under plastic deformation, an indentation into the neck 210 of the lock nut 254 at its indentation site 212, whereby the neck 210 of the lock nut 254 is indented, at its indentation site 212, into the external notch 216. With the angled configuration of the external notch 216, the wheel bearing subassembly 250 has a specific indentation need calling for the neck 210 of the lock nut 254 to be indented, at its indentation site 212, flush into the external notch 216. It can be seen that the inclined configuration of the indentation tool 100 satisfies this specific indentation need. Specifically, in the inclined configuration, with the indentation axis B intersecting the installation axis A at an angle α with respect to normal, the punch 104 indents the neck 210 of the lock nut 254, at the indentation site 212 thereof, at an incline, at a complementary inclined incidence angle β normal to the external notch 216.

As shown in FIG. 4B, after indention, the resulting threading interference in the indented wheel bearing subassembly 250, between the neck 210 of the lock nut 254 and the threaded end 260b of the wheel hub 252, locks the wheel hub 252 and the lock nut 254 from additional threading with respect to one another. The lock nut 254, in turn, is locked in its given axial position on the wheel hub 252. With the punch 104 automatically returning to the home position (H), a user may employ the handle 106 to uninstall the base 102 from the indented wheel bearing subassembly 250. The user may then employ the handle 106 to coaxially install the base 102 onto another, un-indented wheel bearing subassembly 250.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An indentation tool, comprising:
   an installation axis, a radially oriented indentation axis intersecting the installation axis at an incline angle away from normal, and a defined reserved space for an indentation site of a cylindrically-shaped structure, the reserved space spaced apart from the installation axis, and having the indentation axis passing through it;
   a base extending along the installation axis, the base configured for coaxial installation onto the cylindrically-shaped structure, whereby the indentation site thereof occupies the reserved space; and
   an elongate punch spaced apart from the installation axis and extending along the indentation axis, the punch having an indentation tip, and supported by the base for reciprocating radial movement along the indentation axis between a radially outer home position, in which the punch vacates the reserved space for occupation by the indentation site of the cylindrically-shaped structure, and a radially inner indentation position, in which the punch, leading with the indentation tip, reaches into the reserved space to indent the cylindrically-shaped structure at the indentation site thereof, including forcible radial movement along the indentation axis from the home position to the indentation position.

2. The indentation tool of claim 1, wherein the base is configured, as part of the coaxial installation onto the cylindrically-shaped structure, to assume axial alignment with the cylindrically-shaped structure.

3. The indentation tool of claim 2, wherein the base features a radially-facing radial engagement face complementary to one or more radially-facing parts of the cylindrically-shaped structure, and is configured, as part of the coaxial installation onto the cylindrically-shaped structure, to assume axial alignment with the cylindrically-shaped structure by radially engaging the complementary one or more radially-facing parts of the cylindrically-shaped structure with the radial engagement face.

4. The indentation tool of claim 3, wherein the one or more radially-facing parts of the cylindrically-shaped structure to which the radial engagement face is complementary exhibit mutual radial opposition.

5. The indentation tool of claim 2, wherein the base is configured, as part of the coaxial installation onto the cylindrically-shaped structure, to assume a given axial position on the axially-aligned cylindrically-shaped structure.

6. The indentation tool of claim 5, wherein the base features an axially-facing axial engagement face complementary to one or more axially-facing parts of the cylindrically-shaped structure, and is configured, as part of the coaxial installation onto the cylindrically-shaped structure, to assume the given axial position on the axially-aligned cylindrically-shaped structure by axially engaging the complementary one or more axially-facing parts of the cylindrically-shaped structure with the axial engagement face.

7. The indentation tool of claim 1, wherein the indentation tip has an edge extending normally to the indentation axis along an imaginary line intersecting the installation axis.

8. The indentation tool of claim 1, wherein the incline angle is 30-60 degrees away from normal.

9. The indentation tool of claim 1, wherein the incline angle is one of 45 degrees away from normal and 54 degrees away from normal.

10. The indentation tool of claim 1, wherein the punch has a head opposite the indentation tip, the head, in the home position, open to receiving a hammer blow on behalf of the punch, under which the punch is induced to forcibly radially move along the indentation axis from the home position to the indentation position.

11. The indentation tool of claim 1, wherein the punch is supported by the base for automatic return movement along the indentation axis from the indentation position to the home position.

12. The indentation tool of claim 1, further comprising: an elongate handle extending from the base.

13. The indentation tool of claim 12, wherein the indentation tool further includes a primary axis, the installation axis along which the base extends is common to the primary axis, and the handle extends along the primary axis shared with the base.

14. The indentation tool of claim 1, wherein the cylindrically-shaped structure is a component set that includes an internally threaded component threaded together with an externally threaded component, and has the indentation site thereof at a neck of the internally threaded component.

15. A method of progressing the assembly of a component set using an indentation tool having an installation axis and a radially oriented indentation axis intersecting the installation axis at an incline angle away from normal, comprising:
with a component set, in a partially-assembled state, including an internally threaded component with a neck threaded together with an externally threaded component featuring an external notch, such that the neck of the internally threaded component has an indentation site at which the neck is subject to indentation into the external notch of the externally threaded component:
employing a base belonging to the indentation tool, and extending along the installation axis, to coaxially install onto the component set, whereby the indentation site at the neck of the internally threaded component occupies a defined reserved space therefore spaced apart from the installation axis, and having the indentation axis passing through it; and
employing an elongate punch belonging to the indentation tool, spaced apart from the installation axis, extending along the indentation axis, having an indentation tip, and supported by the base for reciprocating radial movement along the indentation axis between a radially outer home position, in which the punch vacates the reserved space for occupation by the indentation site at the neck of the internally threaded component, and a radially inner indentation position, in which the punch, leading with the indentation tip, reaches into the reserved space, to indent the neck of the internally threaded component, at the indentation site thereof, into the external notch of the externally threaded component, the employment of the punch including imparting a hammer blow to the punch, and thereby inducing the punch to forcibly radially move along the indentation axis from the home position to the indentation position.

16. The method of claim 15, wherein:
the external notch of the externally threaded component is angled; and
employing the punch to indent the neck of the internally threaded component, at the indentation site thereof, into the external notch of the externally threaded component, involves indenting the neck of the internally threaded component, at the indentation site thereof, at an incline, into the external notch of the externally threaded component, at a complementary inclined incidence angle normal to the external notch of the externally threaded component.

17. An indentation tool, comprising:
an installation axis and a radially oriented indentation axis intersecting the installation axis at an incline angle away from normal;
an annularly-shaped base extending along the installation axis, the base having:
two opposed ends, one of which is a leading end terminating in an axially-facing lip;
a radially-facing internal wall between the opposed ends, the internal wall framing a receiving space opening from the leading end, the receiving space including, as a sub-space, a defined reserved space at the internal wall, spaced apart from the installation axis, through which the indentation axis passes; and
a punch housing, the punch housing extending radially outward beyond the reserved space from the end opposite the leading end, defining an open-ended internal channel extending along the indentation axis and opening, at a radially inner end, to the internal wall in communication with the reserved space, and unobstructed at a radially outer end, and including a spring mounted to the internal channel; and an elongate punch housed by the punch housing, the punch having an indentation tip and a head opposite the indentation tip, and coaxially received inside the internal channel for reciprocating inclined radial movement along the indentation axis between a radially outer home position, in which the punch vacates the reserved space, and the head protrudes unobstructed from the radially outer end of the internal channel, and a radially inner indentation position, in which the punch, leading with the indentation tip, reaches into the reserved space; wherein under a hammer blow received at the head on behalf of the punch, the punch is induced to forcibly radially move along the indentation axis from the home position to the indentation position, and the spring is further mounted to the punch to thereafter automatically return the punch to along the indentation axis the home position.

18. The indentation tool of claim 17, wherein the incline angle is 30-60 degrees away from normal.

19. The indentation tool of claim 17, wherein the incline angle is one of 45 degrees away from normal and 54 degrees away from normal.

20. The indentation tool of claim 17, wherein the installation axis is common to a primary axis, further comprising:

an elongate handle extending from the base along the primary axis shared with the base from a bifurcated junction therewith at the end opposite the leading end.

* * * * *